US010015022B2

(12) United States Patent
Helms et al.

(10) Patent No.: US 10,015,022 B2
(45) Date of Patent: Jul. 3, 2018

(54) SYSTEM AND METHOD FOR CONTENT SHARING

(71) Applicant: Time Warner Cable Enterprises LLC, New York, NY (US)

(72) Inventors: William L. Helms, Longmont, CO (US); George Sarosi, Charlotte, NC (US); Chris Cholas, Frederick, CO (US); Jeffrey P. Markley, Superior, CO (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 280 days.

(21) Appl. No.: 14/717,530

(22) Filed: May 20, 2015

(65) Prior Publication Data
US 2015/0334438 A1 Nov. 19, 2015

Related U.S. Application Data

(63) Continuation of application No. 12/055,388, filed on Mar. 26, 2008, now abandoned.

(51) Int. Cl.
H04L 12/28 (2006.01)
H04N 21/222 (2011.01)
(Continued)

(52) U.S. Cl.
CPC ...... *H04L 12/2861* (2013.01); *H04L 12/2898* (2013.01); *H04L 65/4084* (2013.01);
(Continued)

(58) Field of Classification Search
CPC .................................................. H04N 21/2743
(Continued)

(56) References Cited

U.S. PATENT DOCUMENTS 6,725,370 B1 * 4/2004 Sakakura ............ H04L 63/0428
713/155
6,871,236 B2 3/2005 Fishman et al.
(Continued)

OTHER PUBLICATIONS

Kodak EasyShare—pp. 1-8 downloaded Oct. 8, 2008, Wikipedia, http://en.wikipedia.org/wiki/Kodak_Easyshare.
(Continued)

*Primary Examiner* — Syling Yen
(74) *Attorney, Agent, or Firm* — Otterstedt, Ellenbogen & Kammer, LLP

(57) ABSTRACT

A video content system includes a head end server module and a content-sharing server coupled to a video content network. Also included is a converged premises gateway module coupled to the video content network at a location remote from the head end server module and the content-sharing server. The converged premises gateway module includes a processor and a video content network interface coupled to the processor and the video content network and configured for communication with the head end server module over the video content network. The gateway module also includes a memory module having a predetermined storage location for content to be shared with the content-sharing server and a local area network configured at least for distribution of video content within the remote location. The system further includes an upload module configured to cause the content in the predetermined storage location to be uploaded to the content-sharing server.

21 Claims, 8 Drawing Sheets

(51) Int. Cl.
| | |
|---|---|
| *H04N 21/218* | (2011.01) |
| *H04N 21/242* | (2011.01) |
| *H04N 21/237* | (2011.01) |
| *H04N 21/61* | (2011.01) |
| *H04N 21/258* | (2011.01) |
| *H04N 21/239* | (2011.01) |
| *H04N 7/173* | (2011.01) |
| *H04N 21/2743* | (2011.01) |
| *H04N 21/2747* | (2011.01) |
| *H04N 21/4147* | (2011.01) |
| *H04N 21/472* | (2011.01) |
| *H04N 21/4788* | (2011.01) |
| *H04L 29/06* | (2006.01) |

(52) U.S. Cl.
CPC ... *H04N 7/17318* (2013.01); *H04N 21/21815* (2013.01); *H04N 21/2223* (2013.01); *H04N 21/237* (2013.01); *H04N 21/239* (2013.01); *H04N 21/242* (2013.01); *H04N 21/25875* (2013.01); *H04N 21/2743* (2013.01); *H04N 21/2747* (2013.01); *H04N 21/4147* (2013.01); *H04N 21/4788* (2013.01); *H04N 21/47202* (2013.01); *H04N 21/6125* (2013.01); *H04L 12/2885* (2013.01)

(58) Field of Classification Search
USPC ........ 707/610, 636, 640, 661, 674, 999.204; 370/254
See application file for complete search history.

(56) References Cited

U.S. PATENT DOCUMENTS

| | | | |
|---|---|---|---|
| 7,266,726 | B1 | 9/2007 | Ladd et al. |
| 7,269,848 | B2 * | 9/2007 | Seshadri ................ G06F 21/31 370/351 |
| 8,347,341 | B2 | 1/2013 | Markley et al. |
| 9,213,538 | B1 | 12/2015 | Ladd et al. |
| 9,525,851 | B2 | 12/2016 | Patel et al. |
| 2002/0156863 | A1 | 10/2002 | Peng |
| 2003/0056217 | A1 | 3/2003 | Brooks |
| 2004/0117837 | A1 | 6/2004 | Karaoguz et al. |
| 2005/0114900 | A1 | 5/2005 | Ladd et al. |
| 2005/0226170 | A1 * | 10/2005 | Relan ................ H04H 60/33 370/254 |
| 2006/0020786 | A1 | 1/2006 | Helms et al. |
| 2006/0020950 | A1 | 1/2006 | Ladd et al. |
| 2006/0026655 | A1 | 2/2006 | Perez |
| 2006/0047957 | A1 | 3/2006 | Helms et al. |
| 2006/0053456 | A1 | 3/2006 | Kelly |
| 2006/0130107 | A1 | 6/2006 | Gonder et al. |
| 2006/0130113 | A1 | 6/2006 | Carlucci et al. |
| 2006/0167764 | A1 * | 7/2006 | Stellittano .......... G06Q 30/0637 705/26.82 |
| 2006/0218604 | A1 | 9/2006 | Riedl et al. |
| 2007/0094691 | A1 | 4/2007 | Gazdzinski |
| 2007/0153820 | A1 | 7/2007 | Gould |
| 2007/0204314 | A1 | 8/2007 | Hasek et al. |
| 2007/0217436 | A1 | 9/2007 | Markley et al. |
| 2007/0294306 | A1 * | 12/2007 | Toutonghi ......... G06F 17/30265 |
| 2008/0066172 | A1 * | 3/2008 | Tarsi .................... H04L 63/105 726/9 |

OTHER PUBLICATIONS

Kodak EasyShare—http://www.kodak.com/eknec/PageQuerier.jhtml?pq-path=130&CID=go&idhbx=easyshares&pq-locale=en p. 1-2 downloaded Oct. 8, 2008.

Kodakgallery.com p. 1-2 downloaded Oct. 8, 2008 About the Company, http://www.kodakgallery.com/AboutUs.jsp?UV=697856655476_14488361813.

Ed Bott et al., "Using Windows 98: second edition" Apr. 15, 2004 pp. 78-106.

* cited by examiner

SYSTEM AND METHOD FOR CONTENT SHARING

CROSS-REFERENCE TO RELATED APPLICATION(S)

The present application is related to a commonly assigned U.S. patent application entitled "Methods And Apparatus For Centralized Content And Data Delivery," Ser. No. 11/378,129 filed Mar. 16, 2006, the complete disclosure of which is expressly incorporated by reference herein in its entirety for all purposes. The present application is a continuation of U.S. patent application Ser. No. 12/055,388 filed Mar. 26, 2008, the complete disclosure of which is expressly incorporated by reference herein in its entirety for all purposes.

FIELD OF THE INVENTION

The present invention relates generally to communications systems and methods, and, more particularly, to video content networks and the like.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

Video on demand (VOD) systems allow users to select and watch video content over a network. Some VOD systems "stream" content for real-time viewing. Others "download" the content to a set-top box before viewing starts. Use of digital video recorders (DVRs), also known as personal video recorders (PVRs), such as the TiVo® device (registered mark of TiVo Brands LLC, Alviso, Calif.) and the R Replay TV® device (registered mark of Digital Networks North America Inc., Pine Brook, N.J.), is ubiquitous. Such devices may provide some benefits to TV viewers. For example, a prior art DVR allows a user to record his or her favorite TV programs for later review, and to exercise a season-pass-like option wherein every episode of his or her favorite program is recorded for some period. Such devices may automatically record programs for the user based on his or her viewing habits and preferences. The presentation of the recorded programming content can be manipulated by exercising rewind, pause, skip and/or fast-forward functions (hereinafter referred to as "trick mode" or "trick play" functions) furnished by the DVR.

A "network PVR (NPVR)" (also referred to as an NDVR (Network Digital Video Recorder)) service allows the user to perform the analogous DVR functions through use of a network, rather than via a local DVR at the user premises. Unlike a DVR device, the NPVR service allows a user to "reserve" past and future programs for his or her review, even if such reserved programs were not identified by the user before their broadcast. Note that an NDVR can be distinguished from a DVR in that the latter, storage of programs and the like is local to the DVR, while in the former (NDVR) case, such storage is at the server or head end level.

A content-based network, a non-limiting example of which is a cable television network, may afford access to a variety of services besides television, for example, broadband Internet access, telephone service, and the like

SUMMARY OF THE INVENTION

Principles of the present invention provide techniques for content sharing. In one aspect, an exemplary video content system includes a head end server module, a content-sharing server, a video content network coupled to the head end server module and the content-sharing server, and a converged premises gateway module coupled to the video content network at a location remote from the head end server module and the content-sharing server. The converged premises gateway module includes a processor and a video content network interface (a non-limiting example of which is a cable modem) coupled to the processor and the video content network and configured for communication with the head end server module over the video content network. The gateway module also includes a memory module having a predetermined storage location for content to be shared with the content-sharing server and a local area network interface configured at least for distribution of video content within the remote location. The system also includes an upload module configured to cause the content in the predetermined storage location to be uploaded to the content-sharing server.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

In another aspect, an exemplary method (which can be computer-implemented) for sharing content from: a converged premises gateway module coupled to a video content network having a head end server module, to: a content-sharing server, includes the step of providing at least one user premises with a converged premises gateway module of the kind described above. The user premises are remote from the content-sharing server and the head end server module. Additional steps include storing the content to be shared in the predetermined storage location and causing the content in the predetermined storage location to be uploaded to the content-sharing server.

In yet another aspect, an exemplary converged premises gateway module for interconnection with a content-sharing server and a video content network having a head end server module, at a location remote from the content-sharing server and the head end server module, includes a processor and a video content network interface coupled to the processor and configured for coupling to the video content network and for communication with the head end server module over the video content network. Also included are a memory module having a predetermined storage location for content to be shared with the content-sharing server, a local area network interface configured at least for distribution of video content within the remote location, and an agent executable on the processor and configured to cause the content in the predetermined storage location to be uploaded to the content-sharing server over the video content network.

An exemplary embodiment of an apparatus or system, according to still another aspect of the invention, can include a memory and at least one processor coupled to the memory. The processor can be operative to facilitate performance of one or more of the method steps described herein. Non-limiting examples of processors are those in one or more servers described herein, a digital set-top terminal, other consumer premises equipment (CPE) such as a converged premises gateway module, and the like. In a further aspect, an apparatus or system can include means for performing the various method steps. The means can include one or more hardware modules, one or more software modules, or a mixture of one or more software modules and one or more hardware modules.

One or more method steps of the present invention can be implemented in the form of an article of manufacture including a machine readable medium that contains one or more programs which when executed implement such step(s).

Techniques of the present invention can provide substantial beneficial technical effects. For example, one or more embodiments may have one or more of the following advantages: reduced upstream bandwidth requirement, sharing of content while maintaining security for a converged premises gateway module, and lower latency in delivery of content (thereby reducing wait time).

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
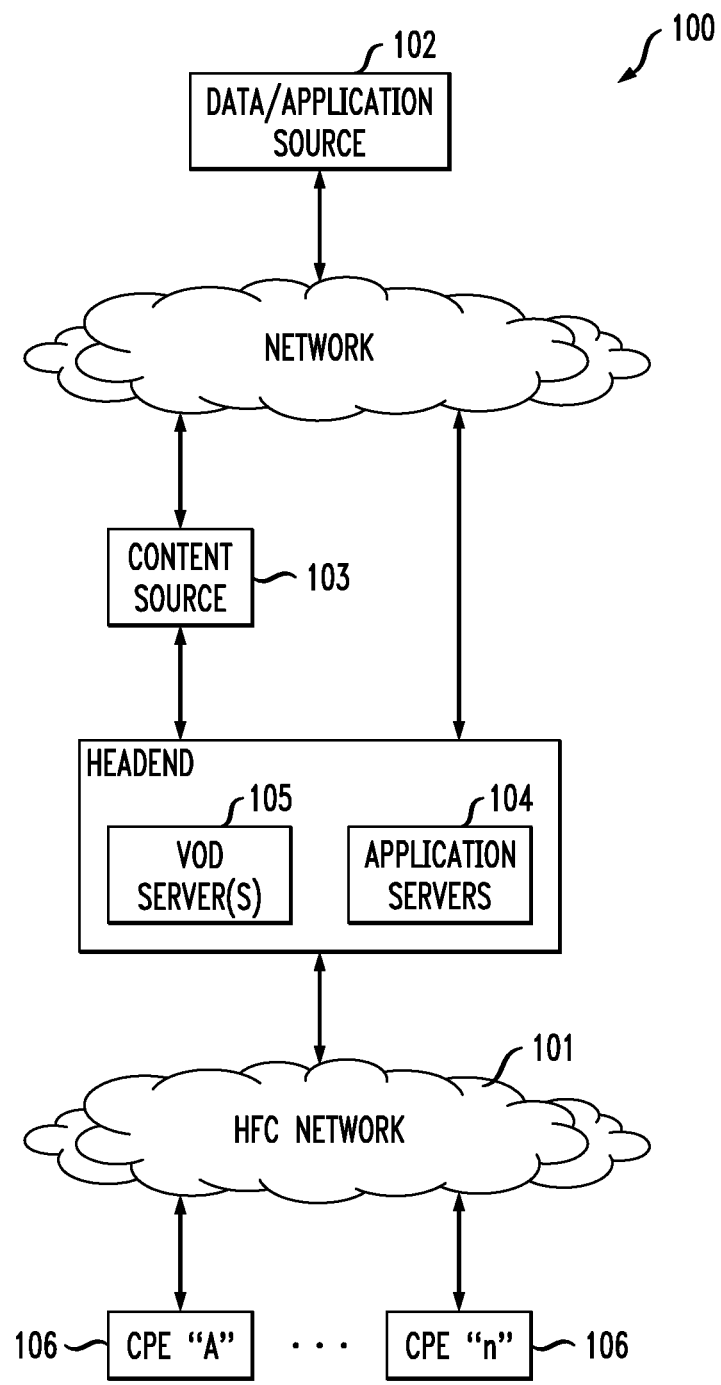
FIG. 1 is a functional block diagram illustrating an exemplary hybrid fiber-coaxial (HFC) network configuration useful with one or more embodiments of the present invention.

In one or more non-limiting embodiments, techniques of the invention can be implemented in connection with a remotely manageable premises device that, inter alia, acts as a centralized client networking platform providing gateway services such as network management as well as traditional content and high-speed data delivery functions. Such a device is disclosed in US Patent Publication 2007-0217436 of Markley et al, entitled "Methods and apparatus for centralized content and data delivery," the complete disclosure of which is expressly incorporated herein by reference for all purposes. The premises device of Markley et al. may be used, for example, in a home or residential environment, enterprise or corporate environment, military or government environment, or combinations of the foregoing. The device also acts as the shared internet (e.g., a world-wide series of interconnected computer networks using internet protocol, commonly referred to as the Internet) connection for all devices in the premises via a cable modem or other such interface, sharing personal and DVR content such as video, music and photos (and any associated metadata) throughout the premises, and providing both a wired and wireless network in the home. Telephony services utilizing e.g., embedded multimedia terminal adapter (eMTA) and/or Wi-Fi architectures may also be provided via the device; these services can make use of the network operator's indigenous voice over Internet protocol (VoIP) or comparable telephony capability if desired, thereby providing an even more unified service environment.

The converged premises device can also provide a trusted domain for content or data, as well as allowing a subscriber total mobility in the home by not limiting content or data to any one viewing/access location. For example, content or data may be accessed on any monitor in the premises, as well as on a personal computer (PC) or personal media device (PMD).

A wired home network utilizing existing coaxial cable in the premises is also created, using e.g., an Ethernet-to-coaxial bridge technology based on the multimedia over coax alliance (MoCA) specification. This will allow existing devices such as digital video recorders (DVRs) to connect and share content with the CPE, and also allows the network operator (e.g., a multi-service operator (MSO)) to control and manage the premises coaxial network.

The CPE is also advantageously accessible via any remote device with internetworking (e.g., Internet) capability, thereby allowing personal content to be accessed by the user from outside the premises.

Exemplary embodiments of premises gateway devices with which one or more inventive techniques can be employed will now be described in detail. While these exemplary embodiments are described in the context of a hybrid fiber coax (HFC) cable system architecture having an MSO, digital networking capability, and plurality of client devices/CPE, the general principles and advantages of may be extended to other types of networks and architectures, whether broadband, narrowband, wired or wireless, or otherwise, the following therefore being merely exemplary in nature. "Coax" is used herein as shorthand for coaxial.

It will also be appreciated that while described generally in the context of a consumer (i.e., home) end user domain, the present invention may be readily adapted to other types of environments (e.g., commercial/enterprise, government/military, etc.) as well. Myriad other applications are possible.

It is further noted that while described primarily in the context of a cable system with 6 MHz RF channels, the present invention is applicable to literally any network topology or paradigm, and any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

FIG. 1 illustrates a typical content-based network configuration with which techniques of the present invention may be used. The various components of the network 100 include (i) one or more data and application origination points 102; (ii) one or more content sources 103, (iii) one or more application distribution servers 104; (iv) one or more video-on-demand (VOD) servers 105, and (v) CPE 106. The distribution server(s) 104, VOD servers 105 and CPE(s) 106 are connected via a bearer (e.g., HFC) network 101. A simple architecture is shown in FIG. 1 for illustrative brevity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104. Exemplary embodiments of a "unified" CPE suitable for use with techniques of the invention are described subsequently herein with respect to FIGS. 2-4.

Figure 1A:
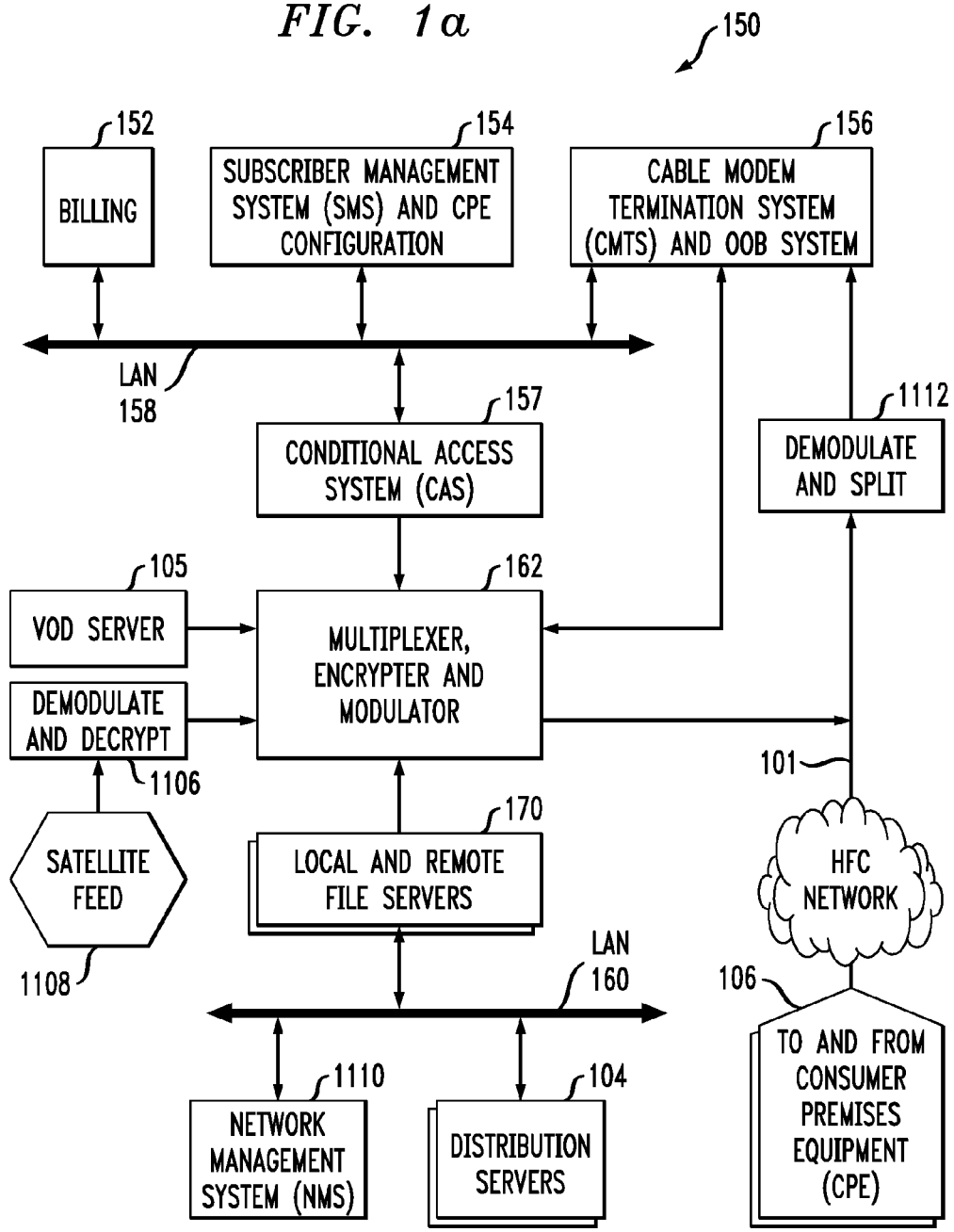
FIG. 1a is a functional block diagram illustrating one exemplary HFC cable network head-end configuration useful with the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (see FIG. 1b) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols. The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Figure 1B:
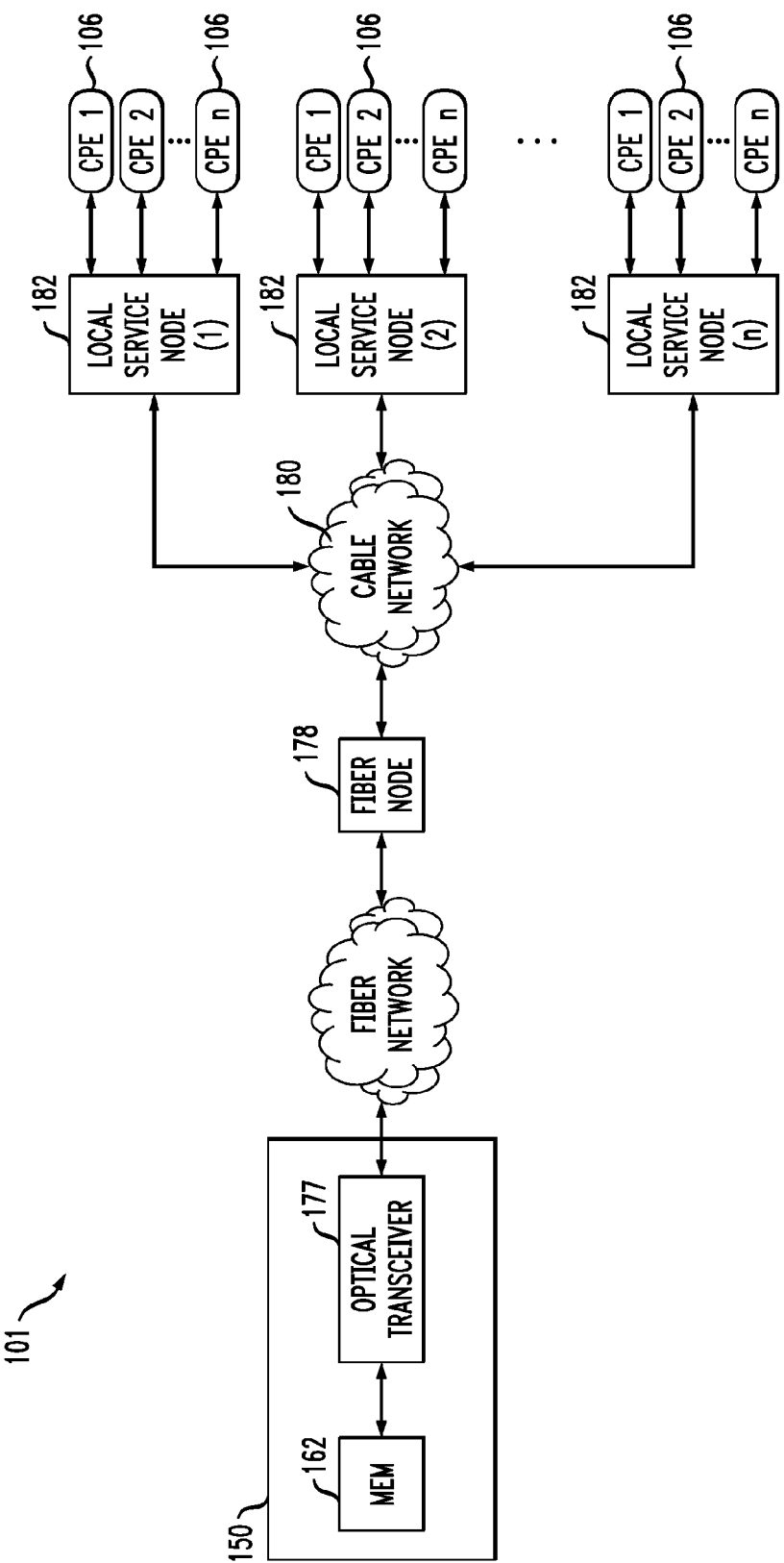
FIG. 1b is a functional block diagram illustrating one exemplary local service node configuration useful with the present invention.

As shown in FIG. 1*b*, the network 101 of FIGS. 1 and 1*a* comprises a fiber/coax arrangement wherein the output of the MEM 162 of FIG. 1*a* is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

Figure 1C:
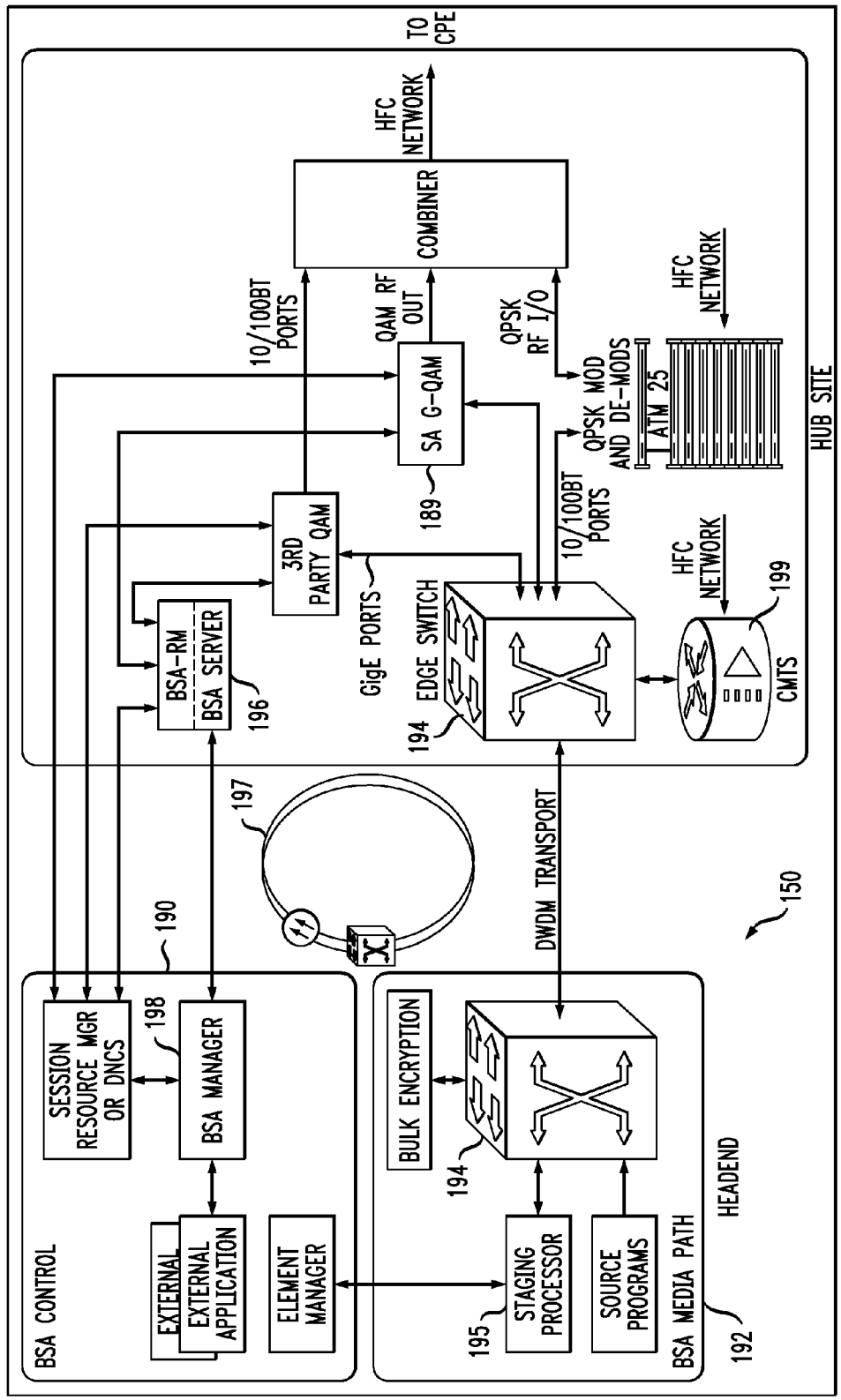
FIG. 1c is a functional block diagram illustrating one exemplary broadcast switched architecture (BSA) network useful with the present invention.

FIG. 1*c* illustrates an exemplary "switched" network architecture also useful with one or more embodiments of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1*c* shows the implementation details of one exemplary embodiment of this broadcast switched network architecture. Specifically, the head-end 150 contains switched broadcast control and media path functions 190, 192 (the latter including staging processor 195); these elements cooperate to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture useful with one or more embodiments of the present invention, although it will be recognized by those of ordinary skill that other approaches and architectures may be substituted.

In addition to "broadcast" content (e.g., video programming), the systems of FIGS. 1*a*-1*c* also deliver Internet data services using the Internet protocol (IP), although other protocols and transport mechanisms of the type well known in the digital communication art may be substituted. One exemplary delivery paradigm comprises delivering MPEG-based video content, with the video transported to user personal computers (PCs) (or IP-based set-top boxes (STBs)) over DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream quadrature amplitude modulation (QAM) channels (QAMs) to the tuner of the user's STB or other receiver device for viewing on the television, and also as packetized IP data over the DOCSIS QAMs to the user's PC or other IP-enabled device via the user's cable modem.

Referring again to FIG. 1*c*, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component. Note also that edge switch 194 in block 150 in FIG. 1*c* can, in the most general case, be the same or different as that shown in the hub site of FIG. 1*c*. Also, in other embodiments, CMTS 199 could be located in a place other than the hub site.

The edge switch 194 forwards the packets received from the CMTS 199 to the QAM modulator 189, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

It will be appreciated that while the exemplary embodiments presented herein are described in the context of Internet services that include multicast and unicast data, the present invention is applicable to other types of services that include multicast transmission of data delivered over a network having multiple physical channels or even virtual or logical channels. For example, switching between various physical channels that comprise a virtual channel, can itself be conducted according to the "switched" approach. As a simple illustration, if a first virtual channel is comprised of physical channels (e.g., QAMs) A, B and D, and a second virtual channel is comprised of QAMs C, E and F, a cable modem (CM) or other CPE can be configured to switch between the A/B/D and C/E/F virtual channels as if they were a single QAM.

Figure 2:
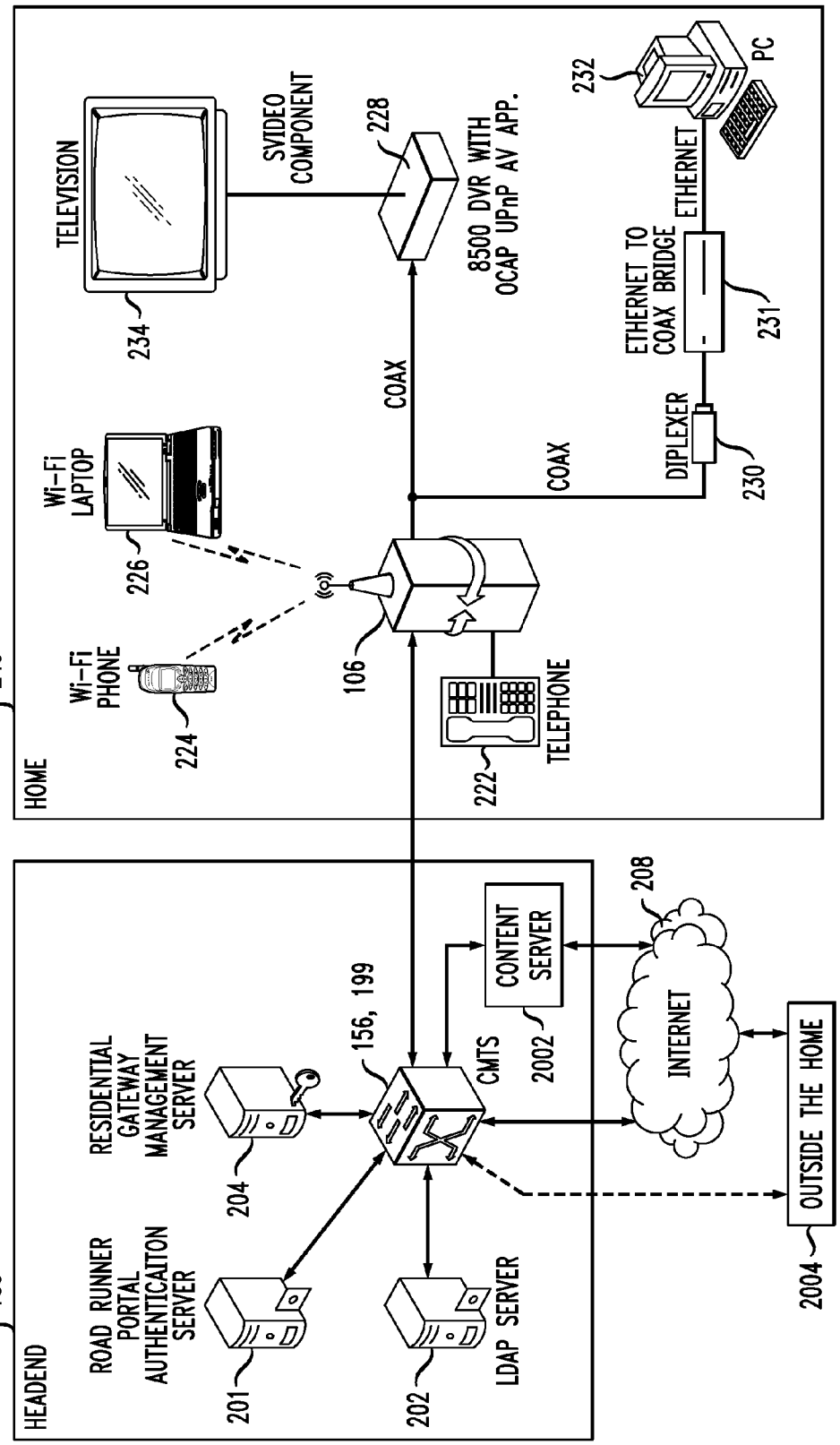
FIG. 2 is a functional block diagram of a content and data distribution network configured in accordance with one embodiment of the invention.

FIG. 2 is a block diagram of a premises network and associated operator-side network elements configured in accordance with one embodiment of the invention. A portal authentication server 201, LDAP (Lightweight Directory Access Protocol) server 202 and gateway management server 204 are each coupled to a cable modem termination system (CMTS) 156, 199 of a type well known in the art. These components are located at the head-end 150 in the illustrated embodiment, although it will be appreciated that the components may be disposed at various other locations as desired consistent with the architecture implemented (e.g., at the BSA hub in a BSA network). The CMTS 156, 199 is coupled also to an internet (e.g., the Internet) 208 which is located external to the head-end 150, such as via an Internet (IP) backbone or gateway (not shown).

The CMTS 156, 199 is in the illustrated embodiment coupled to multiple households or other premises, including the exemplary illustrated household 240. In particular, the CMTS 156, 199 is coupled via the aforementioned HFC network and local coaxial cable or fiber drop to the premises 140, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 and diplexer 230 via a coax cable. A network-to-coax bridge 231 places the coax environment in communication with a network (here, an Ethernet network complaint with IEEE Std. 802.3, although any number of other network protocols and topologies could be used) and a personal computer (PC) 232. The DVR 228 is also connected to a television or other monitor 234, which may be in communication via a wired or wireless interface (e.g., cabling, PAN or 802.15 UWB micro-net, etc.).

A "home LAN" (HLAN) is created in the exemplary embodiment, which may include for example the network formed over the installed coaxial cabling in the premises (described in greater detail below), the Wi-Fi network, and so forth.

During operation, the CPE 106 exchanges signals with the CMTS 156, 199 over the interposed coax (and/or other, e.g., fiber) bearer medium. The signals include e.g., Internet traffic, digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 2. For example, the CPE 106 may exchange digital telephone signals from the CMTS 156, 199 which are further exchanged with the telephone unit 222 or the Wi-Fi phone 224. The digital telephone signals may be IP-based such as Voice-over-IP (VoIP), or may utilize another protocol or transport mechanism. The well known session initiation protocol (SIP) may be used, for example, in the context of a "SIP phone" for making multi-media calls. The network may also interface with a cellular or other wireless system, such as for example a 3G IMS (IP multi-media subsystem) system, in order to provide multimedia calls between a user or consumer in the household domain 240 (e.g., using a SIP phone or H.323 terminal) and a mobile 3G telephone or personal media device (PMD) user via that user's radio access network (RAN). See, e.g., U.S. Patent Publication 2007-0094691 entitled "Method And Apparatus For On-Demand Content Transmission And Control Over Networks" of Robert Gadzinski, filed Oct. 24, 2005, incorporated herein by reference in its entirety for all purposes, wherein media can be streamed between a mobile unit and user CPE 106, including optionally in an on-demand or session-based fashion. For example, content downloaded to the CPE 106 of FIG. 2 herein could be streamed "on demand" to a mobile user, and similarly that mobile user (with proper authentication, etc.) could stream content captured by the mobile device to the CPE 106 for later viewing by that user, or by others within that user's family or "circle" of authorized viewers (sharing). So-called Push-to-talk (PTT) or "Push-to-anything" (PTx) session-based systems can also be used consistent with the invention, such as where a SIP-based device pushes a video clip or other media file to another device using an instantaneously generated SIP session over a 3G IMS or similar bearer coupled with a client device in the user domain 240.

The CPE 106 may also exchange Internet traffic (e.g., TCP/IP and other packets) with the CMTS 156, 199 which is further exchanged with the Wi-Fi laptop 226, the PC 232, or other device by way of a diplexer 230 and the exemplary coax bridge 231. CPE 106 may also receive digital programming that is forwarded to the DVR 128 or to the television 134. Programming requests and other control information may be received by the CPE 106 and forwarded to the CMTS as well. The CMTS routes the information to the corresponding subsystem within the head end 150 or to other systems located upstream from the CPE 106 (such as, for example, the switching hub in a broadcast switched architecture (BSA) network).

In another embodiment of the invention, a personal video encoder (PVE) or comparable device is used as part of or is in communication with the CPE 106 (or an associated client device coupled thereto). For example, the "Slingbox" device manufactured by Sling Media of San Mateo, Calif. is one such exemplary device which is capable of enabling a user to watch TV programming from various locations via an Internet-connected PC or similar device. The device is generally connected between the subscriber's cable/satellite video drop and DSTB, and has a TV tuner inside. The user tunes to a given channel, and the device encodes the video streamed over the cable/satellite in Windows Media or similar format. The encoded content is streamed to a client application on a Windows XP-based or similar PC via an IP network such as the Internet, and hence the user can view the data locally (i.e., at the same premises) or remotely so long as he or she has access to the IP distribution network. This functionality can be made part of a separate physical component, or alternatively have some or all of its functionality disposed within the CPE 106 itself. It may also be integrated with other devices (such as connected client devices or PMDs) as previously noted.

It will be appreciated that the PVE may also be updated itself via the network or other mechanism in terms of capabilities. For example, the PVE can receive new codecs or conditional access (CA) key data from the network so that it can modify its own configuration. These "upgrades" can also be passed through to the subscriber viewing device (e.g., remote PC).

It will also be recognized that the present invention may be used in conjunction with a number of different capabilities and features useful with traditional (prior art) CPE; for example, the error logging and reporting methods and apparatus described in U.S. Pat. No. 7,266,726, of Ladd et al., entitled "Methods and Apparatus for Event Logging in an Information Network" filed Nov. 24, 2003, which is incorporated herein by reference in its entirety for all purposes. The aforementioned disclosure describes methods and apparatus (including APIs) for logging errors that occur on client devices or CPE 106. In the present context, these errors can then be transmitted upstream to a responsible entity (e.g., management node, conditional access server, etc.) for further analysis or correction.

Similarly, the hardware registry apparatus and methods described in U.S. Patent Publication 20050114900 of Ladd et al., entitled "Methods and Apparatus for Hardware Registration in a Network Device" filed Nov. 24, 2003, also incorporated herein by reference in its entirety for all purposes, may be used, as described in the aforementioned Markley publication. The CPE 106 described herein may either be of third-party or leased origin, and hence may benefit under either model when used in conjunction with the foregoing hardware registry approach.

The software interface management apparatus and methods described in co-owned and co-pending U.S. Patent Publication 20060020950 of Ladd et al., filed Jun. 30, 2004 and entitled "Apparatus And Methods For Implementation Of Network Software Interfaces", also incorporated herein by reference in its entirety for all purposes, can be used within the CPE 106 or associated devices, as described in the aforementioned Markley publication.

In another aspect, the CPE 106 of the present invention is also compatible with the methods and apparatus disclosed in U.S. Patent Publication 20070204314 of Hasek et al., filed Feb. 27, 2006 and entitled "Methods And Apparatus For Selecting Digital Access Technology For Programming And Data Delivery", which is incorporated herein by reference in its entirety for all purposes, as described in the aforementioned Markley publication.

Exemplary functioning of the content server 2002 and the element labeled "outside the home" 2004 will be set forth below, after a description of exemplary CPE 106 and an exemplary software architecture for same.

Figure 3:
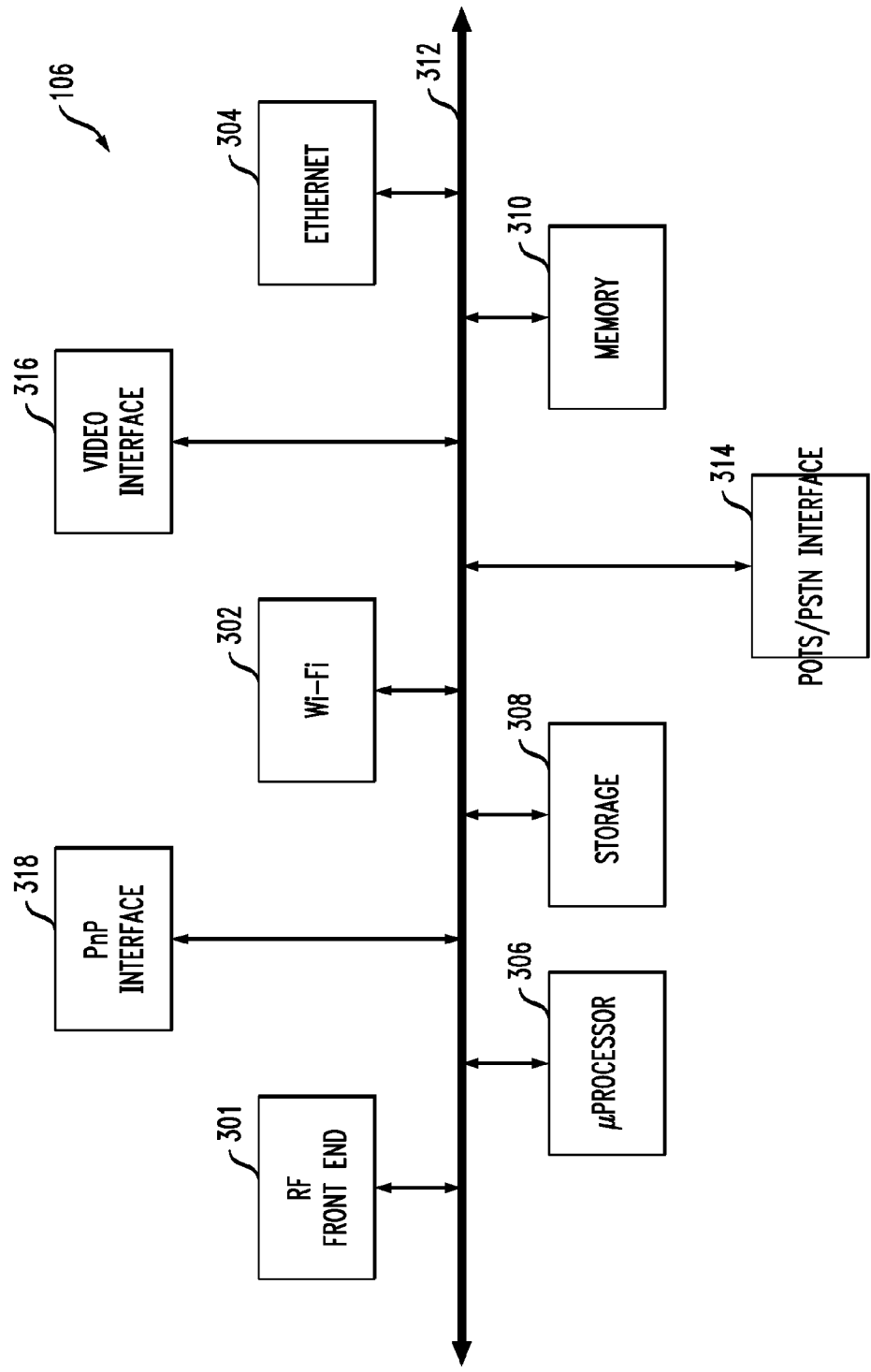
FIG. 3 is a functional block diagram of an exemplary centralized CPE unit configured in accordance with one embodiment of the invention.

FIG. 3 is a block diagram of one exemplary embodiment of the CPE 106 of FIG. 2. The exemplary CPE 106 (also colloquially known as a "hive" in certain configurations due to its centralized yet multifunctional nature) includes an RF front end 301, Wi-Fi interface 302, video interface 316, "Plug n' Play" (PnP) interface 318 and Ethernet interface 304, each directly or indirectly coupled to a bus 312. The microprocessor 306, storage unit 308, plain old telephone service (POTS)/public switched telephone network (PSTN) interface 314, and memory unit 310 are also coupled to the exemplary bus 312. The memory unit 310 typically comprises a random access memory (RAM) and storage unit 308 typically comprises a hard disk drive, an optical drive (e.g., CD-ROM or DVD), NAND flash memory, or some combination thereof.

The CPE 106 also optionally may include a network processing unit (e.g., network processor such as the Freescale/C-Port C-5 NP, not shown) to process the premises or home network (e.g., HLAN) services. The network processor is in one embodiment capable of processing 200 Mbps of real time Ethernet traffic, although other data rates may clearly be supported. The network processor also provides the ability to download firmware updates via TFTP or another selected protocol as desired.

The illustrated CPE 106 can assume literally any discrete form factor, including those adapted for desktop, floor-standing, or wall-mounted use, or alternatively may be integrated in whole or part (e.g., on a common functional basis) with other devices if desired.

It will be recognized that while a linear or centralized bus architecture is shown as the basis of the exemplary embodiment of FIG. 3, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

It will also be recognized that the CPE configuration shown is essentially for illustrative purposes, and various other configurations of the CPE 106 are consistent with other embodiments of the invention. For example, the CPE 106 in FIG. 3 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

Four (4) standard 10/100 Base T Ethernet ports for the purpose of a Home LAN connection are provided in the exemplary device of FIG. 3; however, it will be received that other rates (e.g., Gigabit Ethernet or 10-Gig-E) and local networking protocols (e.g., X.25, etc.) may be used. These interfaces may be serviced via a WLAN interface, wired rj-45 ports, or otherwise. The CPE 106 also includes a plurality of RJ-11 ports for telephony interface, as well as a plurality of USB (e.g., USB 2.0) ports, and IEEE-1394 (Firewire) ports. S-video and other signal interfaces may also be provided if desired.

Various indications are optionally utilized within the CPE 106, including e.g., a WAN light-emitting diode (LED) or other indicator to show cable modem link and activity, e.g., a LAN—802.3 LED or other indicator to show link and activity on one or more of the Ethernet ports, as well as a LAN—802.11 LED or indicator to show that the radio interface is enabled, and activity thereon. Telephony and other LEDs or indicators may also be provided using any number of schemes readily apparent to those of ordinary skill. Furthermore, a "soft" display (e.g., thin-film transistor (TFT) display or liquid crystal display (LCD) having software generated indications) may be used on the CPE 106 (or a remote device in communication therewith) to provide a flexible display environment. The methods and apparatus of co-owned and co-pending U.S. patent application Ser. No. 10/773,664 filed Feb. 6, 2004 entitled "Methods And Apparatus For Display Element Management In An Information Network," expressly incorporated herein by reference in its entirety for all purposes, may be used within the CPE 106 or other communicating devices, as set forth in the aforementioned Markley publication.

The CPE 106 mass storage device 308 of the illustrated embodiment comprises a Serial-ATA (SATA) or Ultra-ATA (also known as Ultra-DMA, or ATA-4/5/6/7) hard disk drive for the operating system and content storage of at least 300 GB, although higher capacities and even RAID arrays may be used for this purpose. The CPE 106 hard disk is preferably removable without the need for tools, and the CPE 106 is also configured allow for an external USB (e.g., USB 2.0) drive to be attached and automatically added to the existing storage. It will also be appreciated that USB keys of the type well known in the art can be used consistent with the USB port(s) of the CPE 106, so as to make the data storage device highly mobile and of very small size.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

The RF front end 301 of the exemplary embodiment comprises a cable modem of the type known in the art. In this fashion, and content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

It will be appreciated, however, that the RF front end 301 of the CPE may comprise (either in addition to or in place of the cable modem) a traditional video RF front end 301 (e.g., tuner) adapted to receive video signals over, e.g., a QAM. For example, one exemplary embodiment of the RF front end 301 comprises one or more tuners, a demodulator, decryption module, and demultiplexer of the type well known in the art, although other configurations may be used. A wideband tuner arrangement such as that described in co-owned and co-pending U.S. Patent Publication 20060130113 of Carlucci et al. entitled "Method and Apparatus for Wideband Distribution of Content" filed Dec. 15, 2004 and incorporated herein by reference in its entirety for all purposes, may also be utilized, such as where the content associated with one or more program streams is distributed across two or more QAMs. Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std 1394), USB/USB2, or any number of other such options.

Programming and other types of data including pictures, video, music or MP3 files, software applications, metadata files, etc. may also be received by way of the various digital interfaces in the CPE 106. These data may be stored locally (e.g., in the CPE storage unit 308) or even on a client device or network agent in communication with the CPE 106, for later use by a user. For example, a user may receive a JPEG or other image from a friend's cellular phone camera, which can then be "pushed" (e.g., via wireless application protocol (WAP) push, IP Multimedia Subsystem (IMS), Bluetooth® (certification mark of the Bluetooth special interest group) object exchange (OBEX) K-11 exchange, etc.) to a corresponding interface on the CPE 106, wherein the image is stored on the mass storage device 308. Similarly, video data from a connected DVD player/burner might be streamed from the player to the CPE 106 for storage thereon (or distribution via yet another interface, such as via the Ethernet interface to the user's connected PC or via Wi-Fi interface to his or her laptop). Many different movements of many different types of data can be accomplished using the CPE, as the CPE acts as a substantially universal "hub" for moving (and transcoding, encrypting/decrypting, compressing, formatting, etc.) data between various different hardware and software environments.

The microprocessor 306 (or other dedicated processor; not shown) can also optionally be configured to run a server process (such as an http server process) that can be used by the remote system to view and configure the status of the CPE 106, such as via an http or other such browser application. The browser can, inter alia, display the list of files included on the mass storage unit 308, including the different media files, pictures and music files. The server process also can act as a proxy for other processes running on the CPE 106, thereby allowing for greater flexibility with respect to asynchronous interfaces of the CPE.

Other devices such as portable music players (e.g., MP3 audio players) may be coupled to the CPE 106 via any number of different interfaces, and music and other media files downloaded for portable use and viewing. In accordance with one embodiment of the invention, the storage unit 208 may include a writable optical drive for writing media files to removable optical disks. So-called "Compact-flash®" memory cartridges (registered mark of Sandisk Corporation) or other media may also be received within the CPE 106 (or a connected reader/writer), so that e.g., music files, digital camera image data, etc. can be readily moved from device to device (or from network environment to other network environment).

One or more embodiments of the present invention also contemplate the use of one substantially universal or converged interface and associated client device, such as a cellular telephone or personal media device (PMD) with personal digital assistant (PDA) capabilities, image-quality digital camera, IMS (IP Multimedia subsystem) or comparable media streaming, digital music/video player, Wi-Fi card or interface, Bluetooth® transceiver, and so forth.

By incorporating the various components, interfaces, and functionality in the CPE 106 as described herein, a single system is capable of providing many of the services commonly employed to acquire and utilize media files and other digital information. Using a single system to provide these services increases user/subscriber economy and convenience. For example, a user may want to listen to music while viewing pictures. He or she may also want to burn an optical disk with music, video, and/or pictures (or some combination thereof). See, e.g., U.S. Patent Publication 2006-0218604 of Riedl et al., filed Mar. 14, 2005, entitled "Method And Apparatus For Network Content Download And Recording" which is incorporated herein by reference in its entirety for all purposes, for one exemplary recording-capable "client device" and associated methods that may be used consistent with the present invention. Locating all the files on a single unit with the ability to interface with other systems such as Wi-Fi, Firewire® IEEE 1394 interface (registered mark of Apple, Inc.), universal serial bus (USB), personal area network (PAN), Ethernet, 5 GHz WLAN, etc. also advantageously allows the media files to be viewed by other systems or client devices connected to the CPE 106 via these interfaces.

In accordance with the exemplary embodiment of the invention, the CPE 106 includes a DOCSIS cable modem for delivery of traditional broadband Internet services. This connection is preferably shared by all Internet devices in the premises 240; e.g. Internet protocol television (IPTV) devices, PCs, laptops, etc. In addition, the CPE 106 can be remotely managed (such as from the head end 150, or another remote network agent) to support IP services such as Dynamic Host Configuration Protocol (DHCP), Domain Name System (DNS), network address translation (NAT) and firewall capabilities as well as anti-virus, pop-up blocking, and spyware protection.

The CPE 106 of the present invention (and parent network) may also be configured for alternate high-speed data capability (i.e., in addition to or in place of the cable modem high-speed data interface previously described). For example, in one exemplary variant, the CPE uses the methods and apparatus of co-owned and co-pending U.S. Patent Publication 20060130107 of Gonder et al., entitled "Method and Apparatus for High Bandwidth Data Transmission in Content-Based Networks" filed Dec. 15, 2004 and expressly incorporated herein by reference in its entirety for all purposes, as described in the Markley publication.

The CPE 106 also preferably creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, one embodiment of the invention uses frequencies on the order of 1150 MHz to deliver data and applications to other devices in the home such as PCs, PMDs, media extenders and set-top boxes. The coaxial network is merely the bearer; devices on the network utilize Ethernet or other comparable networking protocols over this bearer. The bridging device (s) 231 of FIG. 2 may take any number of forms including being embedded into other devices; e.g., as hardware/software/firmware within set top boxes, as a card or similar removable module, or alternatively comprising an external or stand-alone device for connecting PCs and other Ethernet based devices to the coax home network.

The exemplary CPE 106 shown in FIGS. 2 and 3 acts as a Wi-Fi access point (AP), thereby allowing Wi-Fi enabled devices (e.g., 12 in a typical configuration) to connect to the home network and access Internet, media, and other resources on the network. It will be recognized, however, that the CPE 106 may also act as a slave or station (STA) within an ad hoc or other Wi-Fi network, such as where another device on the premises 140 acts as the AP. The CPE 106 can include this Wi-Fi capability in a dedicated radio suite (e.g., one or more ICs or ASICs), as part of a larger system-on-chip (SoC) device, as a Wi-Fi card, or even as an external device that communicates with the CPE 106 or other associated device via a cable or similar connection.

The Wi-Fi interface also provide wired equivalent privacy (WEP), Wi-Fi protected access (WPA) and WPA2 encryption services of the type well known in the art on one or more connections. The interface 302 also may support other protocols, such as the EAP/802.1x Std. for authentication (e.g., using a RADIUS server or the like). Similarly, the CPE 106 can be configured for other types of secure network or tunneling capabilities, such as the wireless transport layer security (WTLS) layer in a WAP stack (e.g., where the CPE acts as a WAP gateway or proxy), or virtual private networking (VPN). Media access control (MAC) level filtering may also be utilized.

In one embodiment, the Wi-Fi interface provides service over substantially all of the premises where it is used; however, other schemes for providing additional coverage can be used as well (such as "daisy-chaining" APs together, etc.). The interface's operating channel is set automatically by scanning for a free channel and initializing the access point on that channel.

The Wi-Fi phone 224 connects to high speed data services via the cable modem previously described, and allows the user to place calls through a digital phone service (a non-limiting example of which is Time Warner Cable digital phone service). Connection to the digital phone service (a non-limiting example of which is Time Warner Cable VoIP) advantageously allows current VoIP customers to use the CPE 106 as a telephony gateway, with the CPE 106 also providing Embedded Multimedia Terminal Adapter (EMTA) functionality. In this fashion, digital phone customers are able to utilize the exemplary CPE 106 as a replacement for their current MTA/EMTA. By plugging traditional analog (e.g., POTS) phones into RJ-11 or comparable ports on the CPE 106, users/customers are able to place phone calls via digital telephone services (such as the aforementioned Time Warner Cable Digital Phone Service). It will be appreciated that a digital cordless (e.g., 900 MHz, 5 GHz, etc.) telephone or other similar device can be used in this capacity; the POTS interface is agnostic to the type of device used, so long as it complies with standardized telephony signaling and electrical/mechanical specifications). In the exemplary embodiment, the CPE 106 has all MTA functionality contained therein, such as via ICs and other electronic circuits and software as is well known in the digital telephony arts.

One feature of the exemplary CPE 106 of FIG. 3 is the ability to act as a central content repository for video (or still) content delivered from DVRs or other such media devices in the premises. In order to accomplish this, various resources in the CPE 106 (including the RF tuners and disk drive(s)) are pooled. For example, the CPE 106 advantageously provides the ability to ingest content from DVRs or other such devices in the home via its Ethernet-over-coaxial interface. The CPE 106 can also discover STBs or other client devices in the home with Ethernet-over-coax capabilities, and generate a resource map table including tuners, disk drives and status, to be used when ingesting and streaming content. This also provides information for "pooling" of resources for each PC, PMD, etc. across the premises network.

In the illustrated architecture, content recorded from any DVR or similar device can be delivered to the CPE 106 via the Ethernet-over-coax connection, or another interface, for storage on the internal mass storage device or another connected device (e.g., RAID). Content may then be securely delivered to any viewing location in the home that shares a common security model via the various interfaces available, including e.g., Wi-Fi and Ethernet. Still content might be provided, e.g., from a digital camera interfacing with PC 232 via a USB port.

In accordance with another embodiment of the invention, a Universal Plug and Play (UPnP) AV media server is included within the CPE 106. The UPnP AV media server allows content such as music, videos and photos to be delivered to UPnP media rendering/recording devices in the home. Content delivered to UPnP rendering and decoding devices will typically be personal content which does not require rights management (e.g., DRM) or copy-protection. Alternatively, "protected" or DRM content can be delivered with the appropriate security package to a rendering device that can receive and authenticate the security package. In one variant, no rendering or recording device is permitted to render or record protected content without proper authentication to the CPE 106 (i.e., to assure that the UPnP or similar device is in fact authorized to receive the content). In another variant, the rendering device can be configured to authenticate the source of the content (i.e., will only render or record content from an authenticated source). For example, the apparatus and methods described in U.S. Patent Publication 2006-0218604 of Riedl et al., previously incorporated herein, can be used to provide such functionality, although other approaches may be used as well.

In accordance with another embodiment of the invention, set-top boxes or other CPE in the home (such as e.g., a DVR 128 enabled device) are able to render music, photos, video, or other media served by the CPE 106 by way of an OCAP-compliant application which works with the OCAP Digital Navigator application (or another comparable navigator). This client application typically contains the UPnP control point and rendering module needed to browse and display available content to the TV or another display device coupled to the STB.

Subscribers may use a web-based computer (e.g., PC) application to perform content upload, render and management operations on the CPE 106, although other software environments are contemplated as well. This web-based user interface (UI) can be indigenous, or delivered to the PC via a webserver running on the CPE 106. The application is adapted to identify whether one or more prerequisites needed to run the application (which might include for example the JAVA Runtime Environment, Microsoft.NET™ Framework 1.1 application, and or other applications) are satisfied. If these required applications are not available on the target computer, then the application will prompt the user, and offer to load the prerequisites before loading the aforementioned user interface. Once all prerequisites have been met, the web browser can be launched with the CPE 106 user interface.

The basic operations of the UI preferably include browsing the local computer for personal content or media such as photos, music and video, and (i) uploading it to the CPE 106, thereby allowing it to be shared throughout the premises (or beyond, as described below); (ii) rendering the uploaded content back to the computer; (iii) managing the content on the CPE 106; and (iv) allowing remote access to the content from any Internet-enabled device capable of rendering the requested content.

The CPE 106 can also have speech recognition, text-to-speech (TTS), and/text-based messaging capability, as described in the Markley publication.

In accordance with one embodiment of the invention, subscribers or other users of the CPE 106 have the ability to access their personal content from any Internet connected PC, whether remote from or local to the CPE 106. They also have the ability to remotely program the DVR at the premises in order to record programs while they are away. For instance, in one exemplary variant, a portal such as, but not limited to, the Time Warner Cable "Road Runner®" Portal (registered mark of Warner Brothers, Inc.) is used to authenticate MSO subscribers, and redirect them to the CPE 106 in their premises. Remote access to the CPE 106 will typically be provided via the cable modem, although the present invention also contemplates the use of other channels (such as for example via a PSTN or cellular telephone, web server, etc.) to gain access to the CPE 106.

The DVD burner or other recording device associated with the CPE 106 can also be used to backup or store personal content and PC configuration files to DVDs. In another embodiment of the invention, a link or other such function resident on the web interface allows users to back up content via a DVD burner built into or integrated with the CPE 106. Alternatively (or in conjunction with the local backup option), data backup services can be provided via the network head-end 150. For example, personal PC data or configuration information can be delivered to a head-end storage facility (e.g., RAID array) via the DOCSIS cable modem interface or other upstream communications channel (e.g., an 00B upstream channel).

In one embodiment of the CPE 106, after installation thereof (whether self-install by the subscriber, or installation by a technician), the CPE 106 allows a subscriber or technician to use a web browser or similar familiar interface to configure simple home network parameters such as, e.g., those relating to DHCP, DNS and Firewall. This configuration may also be performed remotely by a central provisioning system, or locally as well. Such configuration is of use in selecting certain content to be (automatically) shared in accordance with certain techniques of the invention, as discussed below.

Another module of the web interface provided by the CPE 106 allows the user to browse local content on their PC (or other connected devices) such as pictures, music, videos and other media or applications, and upload them to the CPE 106. This module also allows users to manage content via, e.g., "add," "delete," "move," and "rename" functions.

The CPE 106 UPnP server may also be configured to detect newly uploaded content, and/or changes made to stored content, and make this new or upgraded content available to network media rendering devices. This content "refresh" process can be event or occurrence driven (upon the occurrence of a given event such as receipt of a user-initiated "update" or "refresh" operation), periodically (e.g., every X minutes), or according to any number of other different schemes. In an alternate embodiment, for example, new content is signaled to the CPE 106 via a downstream message issued by the head-end server or another network agent/proxy, to which the CPE 106 responds with a refresh operation (download of the new content), and even optional alert to the user via a connected display device, audible cue, etc.

Another module of the exemplary web interface allows the user to view, on the PC or other device in data communication with the CPE 106, personal content served from the CPE 106 via the IP or other interface.

An optional DHCP server running on the CPE 106 manages IP address generation and dissemination on the coax, Wi-Fi, and other local networks in communication with the CPE 106. The cable modem (e.g., DOCSIS) interface of the exemplary embodiment is set to DHCP, and obtains an IP address from the CMTS DHCP server on the appropriate DOCSIS channel.

Internet and Wi-Fi phone traffic is preferably routed from both the coax and Wi-Fi interfaces to the cable modem interface. The CPE 106 also includes the means (e.g., a software module) for doing network address translation (NAT) of the Wi-Fi and coax interfaces, although it will be appreciated that other approaches to address management may be used as well.

Other DVRs or similar recording devices in the home can receive content from the hard drive or mass storage of the CPE 106, thereby allowing playback to happen at viewing locations other than the one where the content was recorded. These other locations may be in direct or indirect communication with the CPE; e.g., connected to or communicating with the CPE directly, or communicating via a gateway, router, or other intermediary device.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network.

In accordance with one embodiment of the invention, the CPE 106 system hardware complies with all FCC rules and regulations that apply to cable television equipment, as well all applicable UL rules and regulations. The exemplary CPE hardware operates on 110±20 VAC, 50-60 Hz, and includes the ability to send and receive a combined minimum aggregate bandwidth of 100 Mbps (summed over all interfaces).

In some instances, the Ethernet port (e.g., 10/100/1000/ 10,000) or other network interface provides auto-negotiation capabilities (e.g., for connection data rate and half- or full-duplex). The exemplary Ethernet interfaces also provide auto-MDI/MDIX (medium-dependent interface/medium-dependent interface crossover). This automatic MDI/MDI-X feature provides the ability to automatically detect the required cable connection type and configure the CPE properly to make use of the indigenous cable type. This feature effectively allows all Ethernet cables usable with any Ethernet device to be connected to the CPE 106 without any additional modification or external logic. In one embodiment, the CPE 106 can identify the cable connection type and adjust its MDI port to the cable by switching between the twisted and "straight" pairs. The auto switching function is typically accomplished prior to the auto-negotiation algorithm previously described, although other configurations are possible (e.g., a 'test-and-then-configure as needed" type approach). The CPE 106 can also optionally disable auto-negotiation and MDI/MDIX and can be manually configured.

The CPE 106 also optionally includes a MoCA, retail compliant F-connector for providing data over coax capability. The exemplary MoCA port operates in the 1125-1525 MHz band, although other frequencies (MoCA compliant or otherwise) may be used for this purpose if desired. The MoCA frequencies can be multiplexed onto the cable input port of the CPE 106, or sent over another channel (e.g., dedicated channel or interface).

The exemplary MoCA interface (not shown) of the CPE 106 is compliant with the Media Over Coax Alliance standard v1.1. The MoCA interface has a maximum physical layer latency of 5 ms, and its transmitter does not exceed +3 dBm (58.1 dBmV). It operates over standard 75 Ohm RG-59 and RG-6 coax, and can be selectively disabled if desired.

The exemplary MoCA interface supports a minimum of 100 Mbps of effective data throughput, at 1364 byte or greater packet size, up to 68 dB of attenuation, and minimum 60 Mbps of effective data throughput at 1364 byte or greater packet size between 68 dB and 80 dB, although other performance capabilities may be used consistent with the invention. The MoCA interface of the illustrated CPE 106 also supports a minimum of 8 active nodes on the coax network.

The CPE 106 also provides a diagnostic mode that allows packet transfer to another device on the MoCA network to characterize the coax network. These diagnostics provide, inter alia, modulation scheme, data throughput, transmit power, receive power, packet or bit error rate (PER/BER), attenuation and signal-to-noise ratio (SNR) feedback from each device during the test. The CPE 106 is also configured to query the number of active devices attached to the MoCA network, and provide a list or output of the active devices based on MAC address.

The MoCA interface maintains at least a 1E-5 Packet Error Rate (i.e., less than or equal to this value). Furthermore, the MoCA interface is configured within the CPE 106 so as to not degrade video quality when it is co-located with a tuner, or interfere with a co-located DOCSIS interface or wireless (e.g., Wi-Fi) interface. In the exemplary embodiment, interference is mitigated or eliminated using an exemplary electromagnetic interference (EMI) (Faraday) noise shield of the type well known in the art, although other approaches (including for example specific component orientation and placement) may be used as well.

The CPE 106 also optionally includes a switched packet interface between the Ethernet port and the MoCA interface.

In one embodiment, data traffic flows through the CPE 106 between the Ethernet or other network interface and MoCA ports without requiring host processor intervention.

The exemplary CPE 106 also provides "spanning tree" functionality in order to avoid or mitigate HLAN traffic loops between the switched Ethernet, Wi-Fi, and MoCA interfaces. A minimum packet size of 1364 bytes is specified when transferring video over the MoCA HLAN interface, although other minimum packet sizes can be used if desired. This packet size requirement insures that maximum effective throughput over the physical medium. Remote network monitoring (RMON) statistics for the Ethernet, Wi-Fi and MoCA interfaces can also be optionally provided to enhance CPE (and network) operational analysis.

The exemplary CPE 106 is also DOCSIS (e.g., 2.0) and PacketCable (e.g., Version 1.5) compliant. The exemplary firmware for the CPE 106 also supports CableHome 1.1 functionality, as well as CableOffice Commercial Annex Specification 1.0. A "residential gateway" mode is also supported within the firmware that provides network address translation (NAT) and routing functionality, optionally without receiving a CableHome configuration file.

The exemplary Wi-Fi wireless interface 302 is also configured to provide a plurality (e.g., four (4)) of unique service set identifiers (SSIDs) simultaneously. These SSIDs are configurable (locally or remotely), such as via a web page. The exemplary interface 302 also provides status information including for example the MAC of the connected devices, IP address and connection speed. This status information is also made available to remote monitoring systems. The interface firmware may also be made remotely upgradeable, such as for example via a cable modem (DOCSIS) channel. SNMP monitoring capabilities (which include active or inactive states, current channel, free channels, SSIDs and connected device number, MAC, IP address and connection speed) are also provided for the interface 302.

In one exemplary embodiment, the CPE 106 includes one or more omni-directional antennas, such as for example a 5.5 dBi gain "rubber duck" Omni antenna operating between 2400-2500 MHz. This antenna utilizes an impedance level of approx. 50 Ohm, with voltage standing wave ratio (VSWR) less than 2.0.

In some instances, the CPE 106 advantageously provides the ability to ingest content from DVRs or other such devices in the home via its Ethernet-over-coaxial interface. The CPE 106 can also discover STBs or other client devices in the home with Ethernet-over-coax capabilities, and generate a resource map table including tuners, disk drives and status, to be used when ingesting and streaming content. This also provides information for "pooling" of resources for each PC, PMD, etc. across the premises network.

The exemplary CPE 106 can also present a catalog of available content to the STBs/client devices using, e.g., the UPnP AV format. The CPE 106 can monitor the resources in the home and communicate contention issues to the STB/client device user interface as well.

The CPE 106 is also configured to receive and store security packages associated with encrypted content from DVRs or other devices in the premises network 140. The CPE 106 can deliver the security packages (and content to STBs/client devices) in the premises for playback. Note that the STB or client device that decodes the requested content may not be the same as the STB or other device that captured the content and delivered it to the CPE 106. The CPE 106 can also stream content or other data from a local hard drive (e.g., the mass storage device 308) to the HLAN or other interfaces. The CPE 106 can also stream content to multiple HLAN ports simultaneously from a single instance of the UPnP AV server, and supports Internet Group Management Protocol (IGMP) "snooping". The CPE 106 is also configured to be resistant/resilient to denial of service attacks on all WAN and HLAN interfaces.

In accordance with another embodiment of the invention, the underlying CPE 106 operating system (O/S) is configured to allow for individual software modules to be loaded and run. The exemplary embodiment of the CPE 106 supports DHCP server functionality for providing IP addresses to the home network via both the Wi-Fi and MoCA interfaces (as well as others if required). The CPE 106 can manually configure static IP addresses for requesting devices based on MAC address.

The CPE 106 may also be made compliant with the Digital Living Network Alliance (DLNA) requirements such as DLNA version 1.0 or later version(s) thereof. The CPE 106 can automatically discover all DLNA capable clients during boot up or other events, and present the available content catalog to one or more clients. The CPE 106 can automatically start a DLNA-compatible media server at boot using only the aforementioned MoCA and/or Wi-Fi network interfaces.

In this role, the CPE 106 is configured to poll the HDD once every n (e.g., 300) seconds for newly available content or content variation and propagate the list of available content to the PC 232 user interface and DLNA clients. This parameter is configurable from the user's web interface.

The CPE 106 provides the capability to transmit/deliver a plurality of SD and HD video formats including, without limitation, MPEG-1, MPEG-2, MPEG-4, AVC/H.264, WMV, VC-1, AVI and Real. The CPE 106 also is capable of transmitting/delivering a plurality of audio formats including e.g., MPEG-2 Audio, AC-3, AC-3+, AAC+, MP3, Real and WMA. A plurality of photo or image formats are also supported, including e.g., Graphic Image File (GIF), Joint Photographic Experts Group (JPEG), Bitmap (BMP) and Tag Image File Format (TIFF). The CPE 106 can also signal real-time streaming services that are available via the cable modem (e.g., DOCSIS) tuner resources.

In the exemplary embodiment, the CPE itself does not contain a decoder for decoding audio/video/media (this is essentially pushed off to the connected media rendering/recording devices); however, it will be recognized that such decoder capability (as well as transcoding, e.g. decoding in a first format and then encoding in a second format) can be implemented within the CPE 106 if desired.

One embodiment of the CPE 106 includes an algorithm that can assemble 1364-byte (or other numbers of bytes) packets when sending real-time video services via user datagram protocol (UDP) in order to maximize physical layer effective throughput. This functionality improves the maximum effective throughput over the physical medium. The CPE can also send streaming video as a unicast service unless one or more devices are accessing the content simultaneously. In this event a multicast (including optionally broadcast) service can be used. This requirement attempts to preserve physical layer bandwidth. Along these lines, the methods and apparatus described in co-pending and co-owned U.S. Patent Publication 2007-0153820 of Gould filed Jan. 3, 2006 and entitled "Methods and Apparatus For Efficient IP Multicasting in a Content-Based Network," incorporated herein by reference in its entirety for all purposes, can be used consistent with the invention, as set forth in the Markley publication.

The CPE 106 can also act as a QOS policy enforcement point in the premises network 140. For example, the CPE 106 can receive and honor policy enforcement configuration files from the head-end or other provisioning system. An 802.1p tag or similar mechanisms can be used to identify QOS priority. For example, a "priority 1" tag can be inserted for streaming video, while a "priority 2" tag can be inserted for VOIP data, a tag of "priority 3" for audio only services, a tag of "priority 4" for all other services, and so forth. Other schemes (which may even be dynamic in nature based on, e.g., user preferences, management entity provisioning, etc.) may also be used consistent with the invention. The CPE 106 can configure the MoCA, Ethernet and other relevant interfaces to handle the data of these defined priorities in the proper order.

The CPE 106 may also include a remote diagnostics application that operates at least on the network processor (NP) core. The CPE 106 provides remote diagnostics and control (including selectively disabling and/or reconfiguring the MoCA, Ethernet, Wi-Fi, or other interfaces remotely) accessible from one or more of the various interfaces, including the internal DOCSIS cable modem.

The software suite of the exemplary CPE 106 also provides a number of other diagnostic and monitoring functions, including: (i) RMON packet statistics from any of the premises LAN interfaces; (ii) the Ethernet port(s) configuration; (iii) speed, duplex, MDI/MDI-X, activity and link status; (iv) MoCA node configuration for each active MoCA node; (v) MoCA MAC control parameters from each active node on the network; (vi) MoCA PHY control parameters from each active node on the network; (vii) MoCA Vendor ID parameters from each active node on the network; (viii) MoCA traffic statistics from each active node on the network; (ix) running a Packet Error test between active nodes on each premises LAN device; (x) a backup feature whereby PC 232 or other client device configuration and files can be identified and stored on the CPE 106 for recovery in the event of a hardware/software failure on that device (including full and targeted or incremental backups).

The CPE 106 also provides a mechanism to identify new devices on the network and grant or deny network resources to the new device based on, e.g. conditional access privileges or business rules. The CPE 106 also includes a web interface for the user implemented via a lightweight web server. The CPE 106 may also insure that the PC 232 or other client device used to access this web interface is properly configured with the appropriate software to run the web application. This may include for example the JAVA Runtime Environment and the UPnP control point and media rendering software. If the PC 232 or client device does not meet these requirements, the web application will attempt to install the needed components on the PC such as by obtaining them locally (i.e., they may be stored on the mass storage device 308), or requesting or retrieving them from a network entity (e.g., the head-end 150, or a dedicated or third-party application server 104). However, the CPE 106 can also be configured to warn users that additional software is needed, and will be loaded, or giving the user the option to cancel the installation. The CPE 106 can also remotely launch the PC/client device user interface application once all software components are installed and operable. The CPE 106 web applications allow the user to browse local personal content on the PC and upload it to appropriate directories on the CPE 106. These directories include, e.g., directories for video, music, imagery, data, and so forth. In the Markley et al. invention, these directories may also be selectively enabled by the user for sharing with others, so as to permit a third party to access the shared (i.e., image or music) folders with their friends, family, so forth, somewhat akin to the prior art Kodak Easyshare image sharing functionality. Sharing may also be subject to authentication and/or encryption procedures of the type well known in the art, if desired. Advantageously, in one or more embodiments of the present invention, as discussed further below, rather than require friends and family to access such directories directly on CPE 106 over a cable television network, content to be shared can be uploaded to a content server, which can be made Internet-accessible.

As previously noted, the CPE 106 web applications also may provide the user content management actions that include "Move," "Copy," "Rename" and "Delete" functions. The user can also be provided with the ability to back up his or her personal content to DVDs via an internal DVD burner if installed, as well as to view any personal content (e.g., video, music, images, etc.) on the PC from the UPnP server on the CPE 106.

The CPE 106 web applications also provide the users the ability to monitor the home network and show connected MOCA and Wi-Fi devices. The CPE 106 web application is configured to present a consistent look and feel throughout the application, thereby simplifying user interface and making it more intuitive. The web application also can incorporate a "personalization engine" to provide user access control over protected content. Parental control rules invoked on the STB can also be carried over to the PC 232 or other client device application and remotely accessed content.

It will further be recognized that the present invention can be used in conjunction with a so-called "trusted domain" for content and other data protection if desired, as described in the Markley publication. Exemplary trusted domain apparatus (and methods) are described in co-owned and co-pending U.S. Patent Publication 2006-0047957 of Helms et al., filed Dec. 7, 2004 and entitled "Technique For Securely Communicating Programming Content" as well as U.S. Patent Publication 2006-0020786 of Helms et al., filed on Jul. 20, 2004 and entitled "Technique for securely communicating and storing programming material in a trusted domain," both of the foregoing being expressly incorporated herein by reference in their entirety for all purposes.

So-called "DCAS" systems (downloadable conditional access systems) may also be used consistent with the invention in order to define/enforce trusted domains within the CPE environment 140, or other environments in data communication therewith.

The exemplary CPE 106 of FIG. 3 may also contain a secure microprocessor (e.g., security processor; not shown) which supports the trusted domain (such as, e.g., the Time Warner Cable Authorized Service Domain). The CPE 106 can transfer content from the Authorized Service Domain (ASD) to the digital rights management (DRM) license domain for content viewed on the PC, or a PMD in communication with the PC 232 (FIG. 2) or CPE 106.

The CPE 106 also provides translation from different encryption environments if required, such as from triple data encryption algorithm (3DES) to the advanced encryption standard (AES) cipher. The CPE 106 can also act as a proxy to a head-end license manager (or other management entity on the network) for content originating upstream of the head-end. For example, one variant of the invention contemplates a "local" or hub content manager entity disposed at the hub of the aforementioned BSA network.

In another variant, the CPE 106 also includes a Home phone networking (HPN) interface, which makes use of indigenous telephony wiring. Also commonly referred to as "HomePNA", this interface allows data interchange between various locations within a localized site such as a residence or small business. HPN systems are generally based on the specifications developed by the Home Phone Networking Alliance (HPNA). HPNA Standard 1.0, the original version of the standard, sets forth specifications for systems operating at 1 Mbps. Later versions of the standard, HPNA 2.0 and 3.0, are based on technology developed by, inter alia, Broadcom, and operate at a faster data rate (e.g., 10 Mbps and more). Advantages of HPN systems include ease of installation, low cost, the ability to have multiple nodes on the network, compatibility with existing networking and PC technologies, and effectively constant data rate (largely independent of concurrent telephone voice signals). HPN systems also have the advantage of obviating expensive and complex server, hub, and router devices. The HPN interface of the CPE 106, when so equipped, uses phone jacks physically located near the desired locations of each computer, gateway, media device, or other network node. This HPNA interface can also communicate with other interfaces on the CPE 106, so as to provide seamless "pass through" of, for example IP packets generated by a PC connected through a telephony jack and wiring to the CPE 106, and then out through another interface (e.g., MoCA or Wi-Fi) to a personal media device or other such client device.

The CPE 106 of FIG. 3 may be configured within a content-based network using, for example, techniques disclosed in the aforementioned Markley publication.

Figure 4:
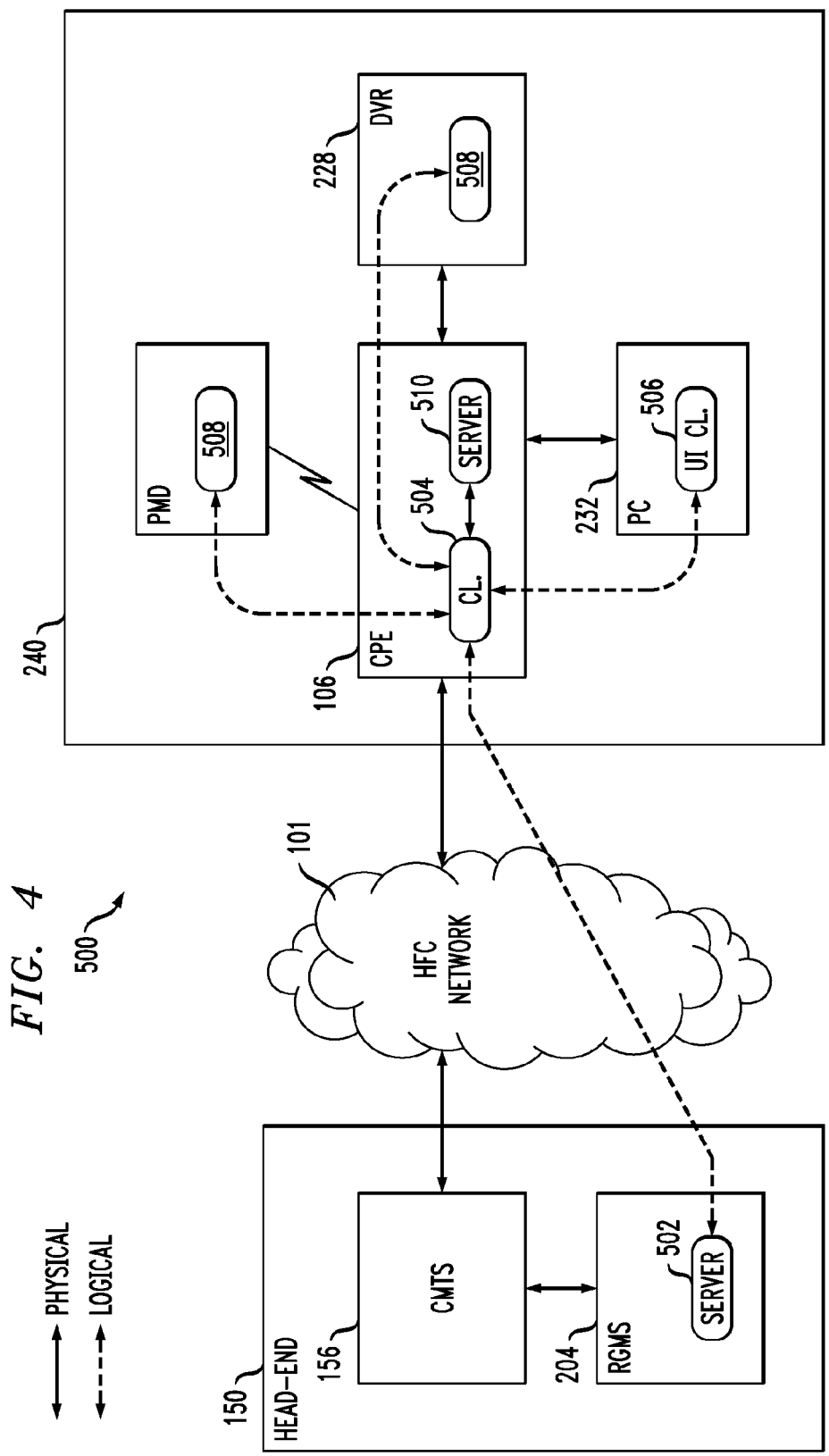
FIG. 4 is a graphical representation of one exemplary embodiment of the software architecture of the network of FIG. 2.

FIG. 4 illustrates one exemplary embodiment of a software architecture of the CPE 106 (and other communicating entities within the network. As shown in FIG. 4, the architecture 500 comprises a configuration "server" process 502, which may be disposed for example on residential gateway management server 204 shown in FIG. 2, or another network agent if desired. By disposing the server process 502 at the head-end or BSA hub, the server process can advantageously configure and provision multiple CPEs 106 simultaneously.

A corresponding client process 504 is disposed on each CPE 106; this process allows the CPE 106 to receive/send information from/to the server process 502, for e.g., remote configuration and provisioning of the CPE 106, monitoring of operations, statistics, status information, etc.

The client portion 504 may also be in logical communication with other processes within the premises, such as for example the user interface (and configuration) process 506 running on the PC 232. Client processes 508 on other devices, such as a wireless device coupled to the CPE 106 via the wireless interface, can also communicate with the CPE process 504.

The CPE 106 may also include various other processes 510, such as a media server, web or http server, and so forth. These can be used in a stand-alone fashion (e.g., where a PMD in the premises network merely accesses the media server in order to obtain stored personal content from the CPE 106), or as a local proxy for other distant servers (such as a remote third party web server, etc.).

It will also be appreciated that one or more of the CPE processes 504, 506, 510 can communicate with head-end or hub processes such as the authentication server (FIG. 2), IP telephony server (not shown), or even a VOD or application server (FIG. 1) if the CPE 106 is so equipped. For example, in one variant, the CPE 106 is configured to act as a STB VOD session proxy, utilizing e.g., LSCP or similar protocols to establish and manage VOD or other sessions on behalf of a connected STB, PMD or other device local within the premises.

The exemplary embodiment of the CPE 106 of the invention utilizes a Linux operating system, although it will be appreciated that any number of different operating systems and software environments can be utilized within the CPE 106. For example, the well-known Sun Microsystems Java environment can be used consistent with one or more functions, as can the Qualcomm "BREW" (binary runtime environment). Myriad different software architectures will be appreciated by those of ordinary skill, given the teachings herein.

Aspects of the invention relate to sharing content from the aforementioned CPE 106. Advantageously, the content is made available not only to the customer while in the home 240, but to friends, family, and others (who may live far away), as indicated by "outside the home" block 2004. Such friends, family and others may be specified by the customer and his or her designees. "Outside the home" block 2004 is outside home 240, but may be within the home of one of the aforementioned friends, family and others.

The kind of content to be shared may include, for example, all kinds of user-generated content, e.g., photos, home video, and the like. Giving the CPE 106 a public IP address would allow people to "ping" the CPE, and that address would provide access to the subscriber's CPE. This approach would tend to expose the CPE to the rest of the world, which creates a potential security issue, as well as creating substantial upstream traffic on a network such as network 101 (for example, if trying to stream videos from CPE 106 across the country).

In one or more embodiments of the invention, a particular directory or set of directories are specified in storage 308 on the CPE (or other appropriate configurations are employed) such that certain content is not only stored on the CPE, but is also published out to a web (content) server 2002 up within the head end 150 (or in another location, for example, one associated with a service provider such as the Flickr™ photo sharing service available from Yahoo! Inc.). So when a friend, family member, or other authorized person wants to access the content, he or she accesses server 2002 or a similar server operated by or on behalf of a third party service rather than accessing the CPE in the home 240.

In one or more embodiments, such content is automatically sought between the two areas (that is, (i) appropriate location in storage 308 and (ii) server 2002 or third party service provider's server). Accordingly, in one or more embodiments certain directories on the hard drive (or other storage 308) of the CPE 106 are automatically scanned and stored in another location (server 2002 in head end 150 or elsewhere, such as at the aforementioned service provider) where they are accessible via the Internet 208 (or otherwise, as discussed below). An agent can access the directory to see if anything new has been added and will upload the new portion to make it available for sharing. A multi-service operator (MSO) or a user may provide appropriate configuration parameters regarding which directories to look in and what content to publish (make available). One simple approach is to list which directories are available for publication. A configuration parameter may be one that the customer can set locally to indicate which directories he or she wants published and by which servers (e.g., server 2002). An agent on the CPE 106 will periodically look for updates and maintain synchronization with server 2002.

Thus, in one aspect of the invention, an exemplary video content system (such as that shown in FIG. 2) includes a head end server module, which may be located in a head end 150 and include the functionality of one or more of servers 201, 202, and 204, as well as CMTS 156, 199. Also included are content-sharing server 2002 (located in head end 150 or elsewhere) and video content network 101 coupled to the head end server module and the content-sharing server. The exemplary system also includes a converged premises gateway module, such as CPE 106, coupled to the video content network 101 at a location (e.g., home 240) remote from the head end server module and the content-sharing server 2002. The converged premises gateway module in turn includes a processor 306 and a video content network interface (such as a cable modem in RF front end 301) coupled to the processor 306 and the video content network 101 and configured for communication with the head end server module over the video content network 101.

The premises gateway module also includes a memory module having a predetermined storage location (for example, one or more pre-determined directories in storage 308 (preferably a hard disk or other non-volatile memory), optionally residing on a dedicated partition) for content to be shared with the content-sharing server 2002, as well as a local area network interface configured at least for distribution of video content within the remote location (for example, video interface 316 coupled via coax to DVR 228 and TV 234). The exemplary video content system also includes an upload module configured to cause the content in the predetermined storage location, such as on 308, to be uploaded to the content-sharing server 2002.

In some instances, the head end server module and the content-sharing server 2002 are collocated in head end 150 of video content network 101. In other instances, the content-sharing server is located remotely from the head end server module at a location associated with a third party service provider, such as the aforementioned Flickr™ service. As noted, the content to be shared can include digital photographs and/or home videos, and the like The aforementioned upload module can be configured to periodically scan the at least one pre-determined directory of the non-volatile memory 308 for new content and cause the new content to be uploaded to the content-sharing server 2002. The at least one pre-determined directory can be, for example, user-selectable, or pre-set by an operator of the video-content network 101. In some cases, the upload module comprises a push agent executable on the processor 306 of the gateway module, while in other instances, the upload module comprises a pull module (e.g., agent) accessible to (e.g., executing on or in association with) the content-sharing server 2002.

In one or more embodiments, the upload module is configured to cause the content in the predetermined storage location to be uploaded to the content-sharing server 2002 over the video content network 101. It will be appreciated that the content need only be uploaded once, rather than each time requested (as might be the case where content was shared directly from CPE 106 to location 2004), thus reducing required upstream bandwidth. In a preferred embodiment, Internet service is provided to the home 240 over CPE 106, using the cable modem in front end 301.

It should be noted at this point that in addition to a conventional HFC network or the aforementioned switched digital network, other kinds of video content networks can be employed for network 101 (e.g., fiber-to-the-home (FTTH) or fiber-to-the-curb (FTTC)).

In some instances, the content-sharing server 2002 includes an associated access-control module (for example, an appropriate software routine) to limit access to the content uploaded to the content-sharing server to pre-determined entities (e.g., family, friends, business associates, and the like). These types of entities are collectively shown as "outside the home" element 2004 in FIG. 2, representing locations other than head end 150 and home 240 with which it is desired to share content. In some instances, write access can also be granted to outside-the-home entities, so that family, friends, business associates, and the like can send content to server 2002. As discussed below, in some instances, content on server 2002 is also downloaded to the home 240.

In a presently preferred (but non-limiting) approach, content-sharing server 2002 is Internet-accessible, as shown by the connection to Internet 208, such that the "outside the home" block 2004 can access the server 2002 via the Internet, to obtain the content to be shared from home 240. However, in other instances, server 2002 may be made accessible to persons wishing to access the content to be shared via the video content network 101 (or both options might be made available).

As noted, CPE 106 may have a variety of different interfaces included therein. Advantageously, one such interface is a telephony interface, such as 314, in data communication with the video content network interface 301. The telephony interface can be configured to transmit packetized voice data to the head end server module via the video content network interface 301.

In another aspect of the invention, a method for sharing content from: (i) a converged premises gateway module, such as 106, coupled to a video content network 101 having a head end server module, to: (ii) a content-sharing server 2002, includes the step of providing at least one user premises 240 with a converged premises gateway module 106 of the kind described. The user premises 240 are remote from the content-sharing server 2002 and the head end server module in head end 150. Additional steps include storing the content to be shared in a predetermined storage location, as described above, and causing the content in the predetermined storage location to be uploaded to the content-sharing server 2002. The latter steps can be executed by a push agent or a pull module (e.g., agent), as described above.

Still another aspect of the invention is a method for sharing content from: a content-sharing server, such as server 2002, to: a converged premises gateway module, such as module 106, coupled to a video content network having a head end server module. Such method can include providing at least one user premises 240 (remote from the content-sharing server 2002) with a converged premises gateway module of the kind described. Additional steps include accepting upload of content to be shared to said content-sharing server 2002 from a location outside said user premises (such as "outside the home" block 2004), and causing said content in said content-sharing server 2002 to be downloaded to said predetermined storage location on module 106.

Yet another aspect of the invention is a converged premises gateway module of the kind described, which may be sold or leased by itself, and may be intended for interconnection and operation as described above.

Figure 5:
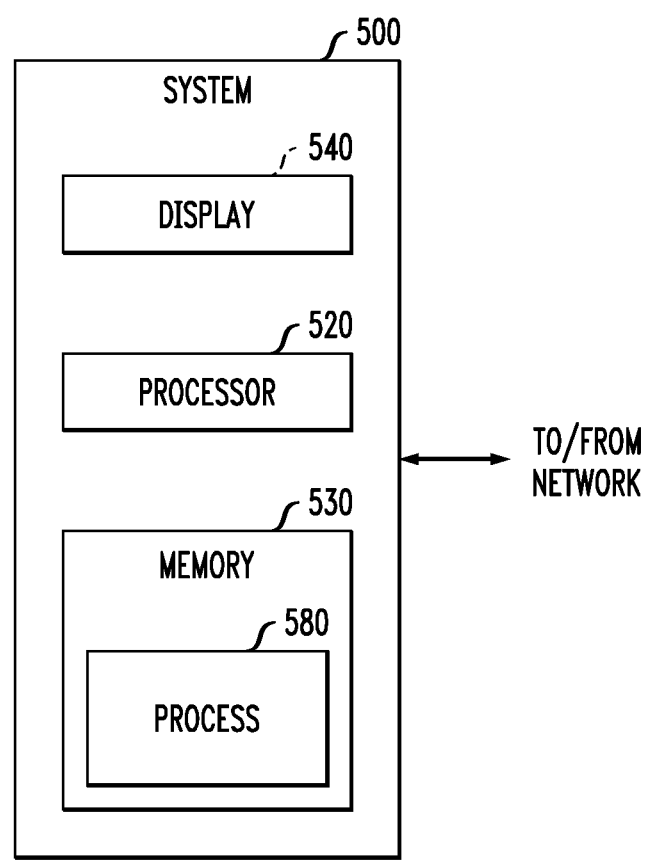
FIG. 5 is a block diagram of a computer system useful in connection with one or more aspects of the invention.

The invention can employ hardware and/or software aspects. Software includes but is not limited to firmware, resident software, microcode, etc. An exemplary embodiment of an inventive apparatus can include a memory and at least one processor coupled to the memory. The processor can be operative to facilitate performance of one or more of the method steps described herein. In another aspect, the apparatus can include means for performing the various method steps. The means can include one or more hardware modules, one or more software modules, or a mixture of one or more software modules and one or more hardware modules (appropriate interconnections via bus, network, and the like can also be included). One or more method steps of the present invention can be implemented in the form of an article of manufacture including a machine readable medium that contains one or more programs that when executed implement such step or steps. FIG. 5 is a block diagram of a system 500 that can implement part or all of one or more aspects or processes of the present invention, processor 520 of which is representative of processors (such as those in elements or blocks 102, 104, 105, 106, 150, 201, 202, 204, 2002, 306, and elsewhere) depicted in the other figures. In one or more embodiments, inventive steps are carried out by one or more of the processors in conjunction with one or more interconnecting network(s). As shown in FIG. 5, memory 530 configures the processor 520 to implement one or more aspects of the methods, steps, and functions disclosed herein (collectively, shown as process 580 in FIG. 5). The memory 530 could be distributed or local and the processor 520 could be distributed or singular. The memory 530 could be implemented as an electrical, magnetic or optical memory, or any combination of these or other types of storage devices. It should be noted that if distributed processors are employed, each distributed processor that makes up processor 520 generally contains its own addressable memory space. It should also be noted that some or all of computer system 500 can be incorporated into an application-specific or general-use integrated circuit. For example, one or more method steps could be implemented in hardware in an ASIC rather than using firmware. Display 540 is representative of a variety of possible input/output devices.

System and Article of Manufacture Details

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

Accordingly, it will be appreciated that one or more embodiments of the present invention can include a computer program including computer program code means adapted to perform one or all of the steps of any methods or claims set forth herein when such program is run on a computer, and that such program may be embodied on a computer readable medium. Further, one or more embodiments of the present invention can include a computer including code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A video content system comprising:
a head end server module;
a content-sharing server;
a video content network coupled to said head end server module and said content-sharing server;
a converged premises gateway module coupled to said video content network at a client-side environment remote from said head end server module and said content-sharing server, said converged premises gateway module in turn comprising:
a processor;
a video content network interface coupled to said processor and said video content network and configured for communication with said head end server module over said video content network;
a memory module having a predetermined storage location for content;
a local area network interface configured at least for distribution of video content within said client-side environment; and
an upload module configured to cause said content in said predetermined storage location to be synchronized to said content-sharing server of an operator of said video-content network;
wherein:
said memory module comprises at least non-volatile memory;
said predetermined storage location comprises at least one pre-determined directory of said non-volatile memory;
said converged premises gateway module executing a client process receiving data from and sending data to a server process executing on said content-sharing server and processing at least one license of said content, said client process acting as a proxy for said server process;
said upload module is configured to periodically scan said at least one pre-determined directory of said non-volatile memory for said content stored in said at least one pre-determined directory of said non-volatile memory and cause said content to be synchronized with content stored on said content-sharing server for sharing said content to a location outside said client-side environment.

2. The system of claim 1, wherein said head end server module and said content-sharing server are collocated in a head end of said video content network.

3. The system of claim 1, wherein said content-sharing server is located remotely from said head end server module at a location associated with a third party service provider.

4. The system of claim 1, wherein said content to be shared comprises user-generated content.

5. The system of claim 1, wherein said content-sharing server comprises an associated access-control module limiting Internet-access to said content uploaded to said content-sharing server to a pre-determined entity outside said client-side environment.

6. The system of claim 5, wherein said access-control module is configured to permit write access to said content-sharing server by said pre-determined entity.

7. The system of claim 1, wherein said content-sharing server is Internet-accessible.

8. The system of claim 1, wherein said content-sharing server is accessible to persons wishing to access said content to be shared via said video content network.

9. The system of claim 1, wherein said upload module comprises a push agent executable on said processor of said gateway module.

10. The system of claim 1, wherein said upload module comprises a pull module accessible to said content-sharing server.

11. The system of claim 1, wherein said upload module is configured to cause said content in said predetermined storage location to be uploaded to said content-sharing server over said video content network.

12. The system of claim 1, wherein said gateway module further comprises a telephony interface in data communication with said video content network interface, said telephony interface being configured to transmit packetized voice data to said head end server module via said video content network interface.

13. A method for sharing content from a converged premises gateway module coupled to a video content network having a head end server module, to a content-sharing server, said method comprising the steps of:
providing at least one user premises with said converged premises gateway module, said user premises being a client-side environment remote from said content-sharing server and said head end server module, said converged premises gateway module comprising:
a processor;
a video content network interface coupled to said processor and said video content network for communication with said head end server module over said video content network;
a memory module having a predetermined storage location for content; and
a local area network interface configured at least for distribution of video content within said user premises;
storing said content in said predetermined storage location; and
causing said content in said predetermined storage location to be synchronized to said content-sharing server;
wherein:
said memory module comprises at least non-volatile memory;
said predetermined storage location comprises at least one pre-determined directory of said non-volatile memory;
further comprising:

executing a client process receiving data from and sending data to a server process executing on said content-sharing server and processing at least one license of said content, said client process acting as a proxy for said server process;

periodically scanning said content stored in said at least one pre-determined directory of said non-volatile memory; and causing said content stored in said at least one pre-determined directory of said non-volatile memory to be synchronized with content stored on said content-sharing server for sharing said content to a location outside said client-side environment.

14. The method of claim 13, wherein said head end server module and said content-sharing server are collocated in a head end of said video content network.

15. The method of claim 13, wherein said content-sharing server is located remotely from said head end server module at a location associated with a third party service provider.

16. The method of claim 13, wherein said content to be shared comprises user-generated content.

17. The method of claim 13, wherein said step of causing said content in said predetermined storage location to be synchronized with content stored on said content-sharing server comprises a push agent executable on said processor periodically scanning said at least one pre-determined directory of said non-volatile memory for new content and causing said new content to be synchronized with said content-sharing server.

18. The method of claim 13, wherein said step of causing said content in said predetermined storage location to be synchronized with content stored on said content-sharing server comprises a pull module accessible to said content-sharing server periodically scanning said at least one pre-determined directory of said non-volatile memory for new content and causing said new content to be synchronized with said content-sharing server.

19. The method of claim 13, further comprising the additional steps of:
  accepting upload of additional content to be shared to said content-sharing server from a location outside said user premises; and
  causing said additional content in said content-sharing server to be downloaded to said memory module.

20. A converged premises gateway module for interconnection with a content-sharing server and a video content network having a head end server module, at a client-side environment remote from said content-sharing server and said head end server module, said converged premises gateway module comprising:
  a processor;
  a video content network interface coupled to said processor and configured for coupling to the video content network and for communication with the head end server module over the video content network;
  a memory module having a predetermined storage location for content;
  a local area network interface configured at least for distribution of video content within said client-side environment;
  a proxy module executing a client process receiving data from and sending data to a server process executing on said content-sharing server and processing at least one license of said content, said client process acting as a proxy for said server process; and
  an agent executable on said processor and configured to cause said content in said predetermined storage location to be synchronized to the content-sharing server over the video content network for sharing said content to a location outside said client-side environment;
  wherein:
  said memory module comprises at least non-volatile memory;
  said predetermined storage location comprises at least one pre-determined directory of said non-volatile memory; and
  said agent is configured to periodically scan said content stored in said at least one pre-determined directory of said non-volatile memory and cause said content to be synchronized with content stored on the content-sharing server.

21. The module of claim 20, further comprising a telephony interface in data communication with said video content network interface, said telephony interface being configured to transmit packetized voice data to the head end server module via said video content network interface.

* * * * *